United States Patent [19]

Tokita et al.

[11] Patent Number: 4,866,459
[45] Date of Patent: Sep. 12, 1989

[54] IMAGE SCANNER WITH A NON-SPHERICAL Fθ LENS SYSTEM

[75] Inventors: Muneo Tokita, Yokohama; Niro Nagata, Kawasaki, both of Japan

[73] Assignee: Kabushiki Kaisha Toshiba, Kawasaki, Japan

[21] Appl. No.: 160,001

[22] Filed: Feb. 24, 1988

[30] Foreign Application Priority Data

Feb. 27, 1987 [JP] Japan .................................. 62-42927
Feb. 27, 1987 [JP] Japan .................................. 62-42928
Feb. 27, 1987 [JP] Japan .................................. 62-42931
Feb. 27, 1987 [JP] Japan .................................. 62-42932

[51] Int. Cl.⁴ ........................ G01D 9/42; G02B 26/08
[52] U.S. Cl. ..................................... 346/108; 350/6.8
[58] Field of Search .................. 346/108, 107 R, 160; 350/6.8, 6.5, 6.7

[56] References Cited

U.S. PATENT DOCUMENTS

4,712,884 12/1987 Sakumo .............................. 350/6.8
4,756,583 7/1988 Morimoto .......................... 350/6.8

FOREIGN PATENT DOCUMENTS

61-120112 6/1986 Japan .

*Primary Examiner*—E. A. Goldberg
*Assistant Examiner*—Mark Reinhart
*Attorney, Agent, or Firm*—Foley & Lardner, Schwartz, Jeffery, Schwaab, Mack, Blumenthal & Evans

[57] ABSTRACT

A laser printer includes a semiconductor laser for generating a laser beam which is modulated according to information, a rotating polygon mirror for scanning the laser beam generated by the semiconductor laser, and an fθ lens system for imaging, onto a photosensitive drum, the laser beam scanned by the rotating polygon mirror. The fθ lens system has first and second lenses arranged, in this order, next to the rotating polygon mirror and on the optical path through which the laser beam is introduced from the rotating polygon mirror to the photosensitive drum. Each of the first and second lenses has light-entering and -emerging faces which are formed in a non-spherical shape.

16 Claims, 17 Drawing Sheets

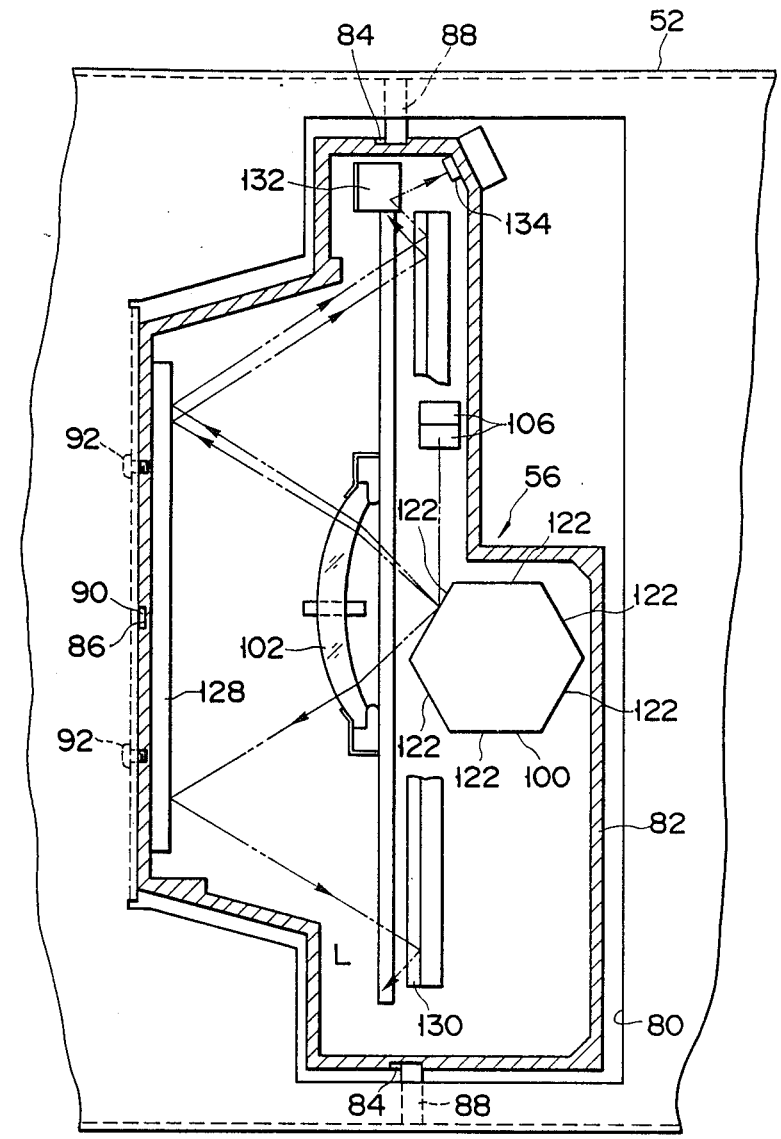
F I G. 4

CURVATURE OF FIELD RESULTING
FROM THE USE OF 1ST fθ LENS

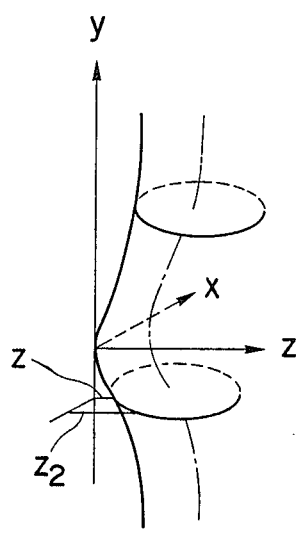
F I G. 19

IMAGE SCANNER WITH A NON-SPHERICAL Fθ LENS SYSTEM

BACKGROUND OF THE INVENTION

The present invention relates to a recording apparatus such as the laser printer.

In a laser printer as shown in FIG. 1, for example, laser beam L generated by a laser generator (not shown) is scanned by rotating polygon mirror 2. This scanned laser beam L is introduced onto photosensitive drum 12, via first fθ lens 4, first mirror 6, second mirror 8, and second fθ lens 10, whereby the surface of drum 12 is exposed. Since the surface of photosensitive drum 12 has been previously been charged by charger 14, an electrostatic latent image is formed thereon. In FIG. 1, numeral 16 denotes a means for developing the electrostatic latent image to form a developed image, 18 a charger for transferring the developed image onto a sheet of paper, 20 a means for fixing the transferred image on the sheet of paper, 22 a tray for receiving the sheet of paper on which the image has been fixed, 24 a cleaning means for removing the developing agent remaining on photosensitive drum 12 after image transfer, 26 a lamp for removing electricity from the surface of photosensitive drum 12 after the cleaning process has been completed, 28 a cassette for storing paper sheets which are to be supplied between photosensitive drum 12 and transfer charger 18, and 30 a guide for supplying the paper sheets manually.

First fθ lens 4 is spherical, while second fθ lens 10 is a toric. Either the light-entering face or the light-emitting face of second lens 10 can be formed having a toric face, this face being formed by rotating an arc. When the scanning angle of rotating polygon mirror 2 becomes greater than ±30° in this case, the property of the fθ lens cannot be satisfied. The scanning angle which can meet the property of the fθ lens accordingly becomes small. It is therefore needed that the optical path extending from rotating polygon mirror 2 to photosensitive drum 12 is made long for the purpose of making the scanning width large on photosensitive drum 12. The apparatus thus becomes large in size and expensive in cost.

SUMMARY OF THE INVENTION

The object of the present invention is to provide a recording apparatus smaller in size and lower in cost.

According to an aspect of the present invention, there is provided a recording apparatus for recording images on a recording medium, which comprises, means for scanning light modulated according to information, and an fθ lens system for imaging, on the recording medium, the light scanned by the scanning means, the fθ lens system having first and second lens arranged next to the scanning means, in this order, and on the optical path of the light introduced from the scanning means to the recording medium, each of these first and second lens having light-entering and -emitting faces each formed in a non-spherical shape.

According to the recording apparatus of the present invention, the property of the fθ lens can be fulfilled even when the scanning angle is made equal to about ±45°. Therefore, the optical path extending from the scanning means to the recording medium can be made shorter.

BRIEF DESCRIPTION OF THE DRAWINGS

FIG. 4 shows how the exposure means is arranged in the laser printer.

FIG. 19 is a view intended to explain the shape of the second fθ lens in FIG. 18.

DETAILED DESCRIPTION OF THE PREFERRED EMBODIMENT

Figure 2:
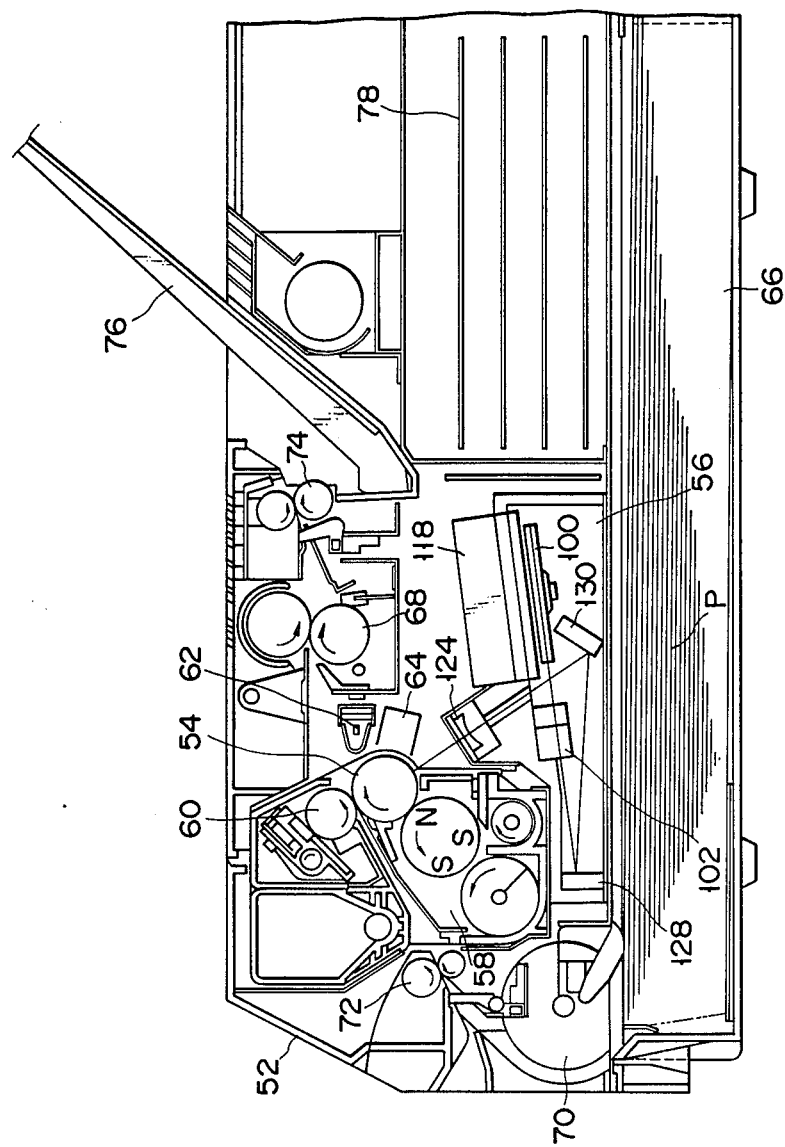
FIG. 2 is a sectional view showing an example of the recording apparatus or laser printer according to the present invention.

FIG. 2 shows an example of the recording apparatus or laser printer according to the present invention. In FIG. 2, numeral 52 represents a casing. Photosensitive drum 54 which is rotated in a direction shown by an arrow is arranged in the center of casing 52. Exposure means 56 is located below photosensitive drum 54 and it exposes photosensitive drum 54 at a certain area thereof, which has been previously charged, according to image information to thereby form an electrostatic latent image thereon. From the exposure region, the following are arranged: developing means 58 for developing the latent electrostatic image to form a toner image; transfer roller 60 for transferring the toner image from photosensitive drum 54 onto paper sheet P; discharge lamp 62 for electrically discharging photosensitive drum 54, to remove the surface potential therefrom; and charger 64 for uniformly charging the surface of photosensitive drum 54. These structural components are arranged in the rotating direction of photosensitive drum 54 in the order mentioned. Paper sheet supply cassette 66 is detachably attached to the underside of casing 52. Fixing means 68 is located in the upper portion of casing 52. Paper sheets P in paper sheet supply cassette 66 are fed by roller 70. Paper sheet P thus fed is aligned by aligning rollers 72. Paper sheet P thus aligned is sent between a pair of rollers 74, passing through the transferring section and fixing means 68. The transferring section is located between photosensitive drum 54 and transfer roller 60. Fixing means 68 fixes the developed image onto paper sheet P. Paper sheet P is discharged by rollers 74 onto tray 76 located in the upper portion of casing 52. Numeral 78 denotes a control means located between paper sheet supply cassette 66 and tray 76 and this control means 78 controls the whole of the printer.

The surface of photosensitive drum 54 is uniformly charged by charger 64 when an image is to be formed. This charged photosensitive drum 54 is then exposed by exposure means 56. An electrostatic latent image is thus formed on photosensitive drum 54. The developing agent is applied to this electrostatic latent image by developing means 58, thereby making the electrostatic latent image visible. A developed image is thus formed. The developed image is then transferred onto paper sheet P by transfer roller 60 at the transferring section. The developed image which has been thus transferred onto paper sheet P is fixed on paper sheet P by fixing means 68. Paper sheet P is then discharged onto tray 76 by rollers 74. After the developed image is transferred onto paper sheet P, the electrical potential on the surface of photosensitive drum 54 is removed by lamp 62 and photosensitive drum 54 is thus made ready for a next cycle of processes.

Figure 3:
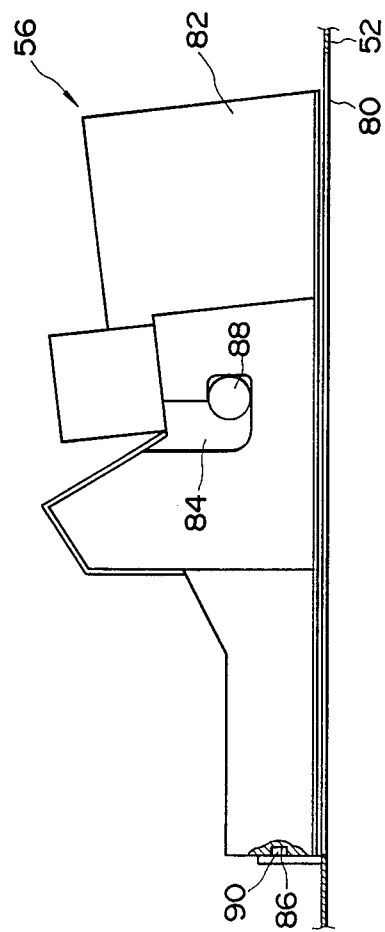
FIG. 3 is a side view showing an exposure means in the laser printer shown in FIG. 2.

As shown in FIGS. 3 and 4, opening 80 is provided in the bottom of casing 52. Exposure means 56 is inserted into casing 52 through this opening 80. Case 82 for exposure means 56 is provided with L-shaped grooves 84 at both sides thereof and recess 86 at other side thereof. Casing 52 is provided with a pair of pins 88 engaged with grooves 84 and projection 90 fitted into recess 86. When exposure means 56 is to be attached to casing 52, it is lifted, keeping its grooves 84 engaged with pins 88. It is thus inserted into casing 52 from below through opening 80. When pins 88 reach the bottom of grooves 84, exposure means 56 is slid in the horizontal direction. When pins 88 come to the end of grooves 84, projection 90 of casing 52 is fitted into recess 86 of case 82. Exposure means 56 is thus limited in its movement up and down and in its rotating direction. As the result, its position is determined relative to photosensitive drum 54. When it is positioned like this, it is fixed to casing 52 by means of screws 92 (FIG. 4). It can be therefore independently attached to and detached from casing 52. In addition, it can be held at a certain position even when screws 92 are unscrewed. Therefore, its incorporation into casing 52 can be easily achieved and its position adjustment cannot be needed.

Figure 5:
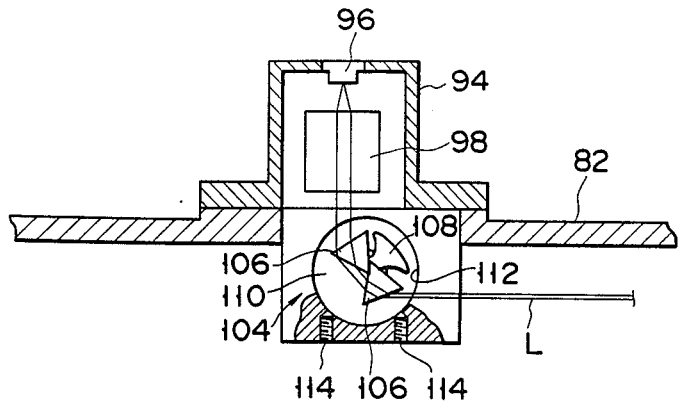
FIG. 5 shows laser and prism units in the exposure means.
Figure 6:
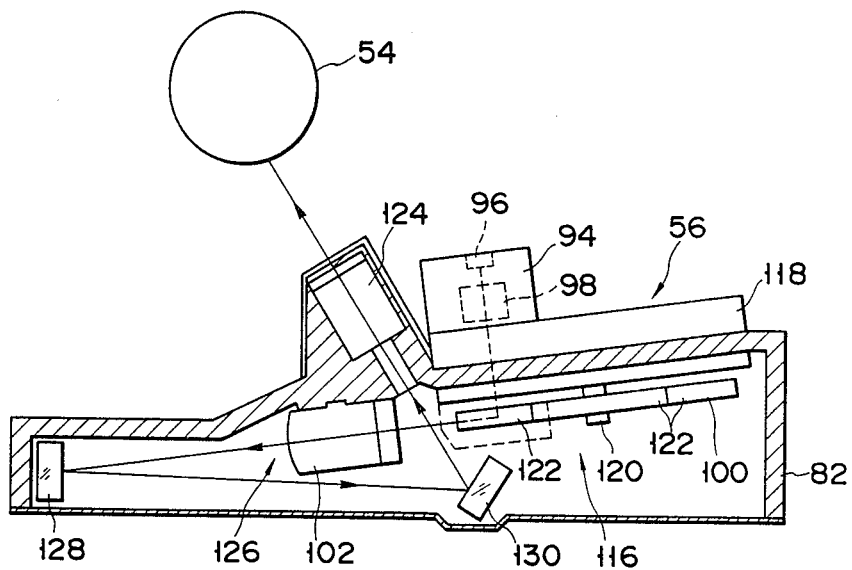
FIG. 6 is a vertically-sectioned view showing the exposure means.

As shown in FIGS. 5 and 6, laser unit 94 is located on the top of case 82 of exposure means 56. Semiconductor laser 96 and collimator lens 98 are set integral to each other in laser unit 94. Semiconductor laser 96 generates laser beam L which is modulated according to image information. Laser beam L thus generated is paralleled by collimator lens 98. Laser unit 94 freely rotates, taking the optical axis of laser beam L emitted from semiconductor laser 96 (or optical axis of laser beam L paralleled by collimator lens 98) as its rotation axial center. In addition, it is attached to case 82 in such a way that the optical axis of laser beam L emitted from semiconductor laser 96 becomes substantially vertical to an optical scanning place between rotating polygon mirror 100 and first fθ lens 102 which will be described later.

As shown in FIG. 5, prism unit 104 is arranged in case 82. Prism unit 104 includes two triangular prisms 106. Both ends of triangular prisms 106 are held by holder member 110 through plate springs 108 in such a way that apical angles of triangular prisms 106 are directed in a same direction. Laser beam L which has been paralleled by collimator lens 98 is made shorter only in a direction of its section and thus deflected substantially at a right angle. Laser beam L therefore has an appropriate spot size on photosensitive drum 54. Holder member 110 is freely rotatably fitted in opening 112 in case 82 and fixed at a desired position by screws 114. Therefore, the rotating position of holder member 110 can be finely adjusted. Light emitted through triangular prisms 106 can be thus finely adjusted to head in a desired direction.

As shown in FIG. 6, scanning means 116 is located in case 82 and provided with motor 118 which is mounted on the top of case 82. Shaft 120 of motor 118 is projected downward and inclined. Rotating polygon mirror 100 is attached to shaft 120 and it scans laser beam L, which has been deflected by triangular prisms 106, only by such a width that corresponds to the recording area of photosensitive drum 54. It is formed like a hexagonal column, having six reflecting faces 122 on its side. It can scan laser beam L at a wide angle of about ±45°.

Figure 1:
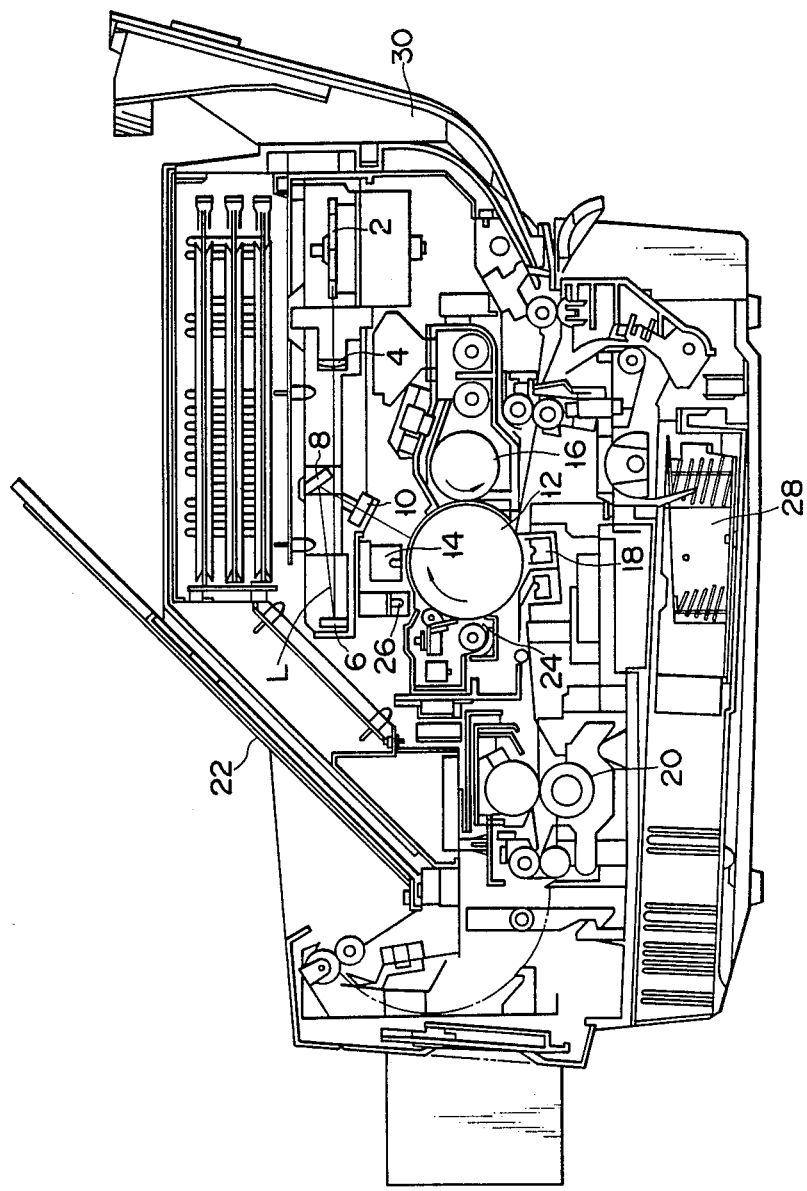
FIG. 1 is a sectional view showing the conventional laser printer.

The distance from rotating polygon mirror 100 to photosensitive drum 54 is 261 mm in the case of the conventional apparatus shown in FIG. 1 but 258 mm in the case of the apparatus of the present invention. The conventional apparatus is intended for paper sheets of A4 size and when they are scanned over a width of 210 mm with an fθ lens whose focal distance f is 215 mm, therefore, $\theta = (\frac{1}{2}) \times (210/f)(rad) = (\frac{1}{2}) \times (210/215) \times (180/\pi) = \pm 28°$. The polygon mirror employed by the conventional apparatus is therefore an octagonal column having eight reflecting faces on its side. When the apparatus of the present invention is used for paper sheets of A3 size, a scanning angle of +41° is needed to scan them over a length of 297 mm using fθ lens system 126 whose effective focal distance f is 209 mm substantially equal to that in the conventional apparatus, because $\theta = (\frac{1}{2}) \times (297/209) \times (180/\pi) = \pm 41°$. This causes the apparatus of the present invention to use rotating polygon mirror 100 shaped like a hexagonal column, as described above.

The fθ lens system 126 consisting of first and second fθ lenses 102 and 124 is arranged together with first and second mirrors 128 and 130 in case 82. Second fθ lens 124 is located at the upper portion of case 82. Second mirror 130 is located adjacent to motor 118. Laser beam L scanned by rotating polygon mirror 100 is successively reflected by first and second mirrors 128 and 130 after passing through first fθ lens 102. Laser beam L reflected by second mirror 130 passes between rotating polygon mirror 100 and first fθ lens 102. After it passes through second fθ lens 124, laser beam L is collected on photosensitive drum 54 and scanned in the width direction (or main scanning direction) of photosensitive drum 54. The width of first fθ lens 102 is determined in such a way that the effective scanning angle is ±44°, for example. Since first fθ lens 102 has a positive refractive index, the width of second fθ lens 124 is set in such a manner that the effective scanning angle is +32°, for example. Third mirror 132 is located at one end of second fθ lens 124 (see FIG. 4). This third mirror 132 reflects laser beam L, which has a scanning angle larger than ±32°, in a direction perpendicular to shaft 120 of motor 118. Laser beam L thus reflected is detected by photoelectric converter element 134, which outputs a signal for controlling the record starting position.

Figure 7:
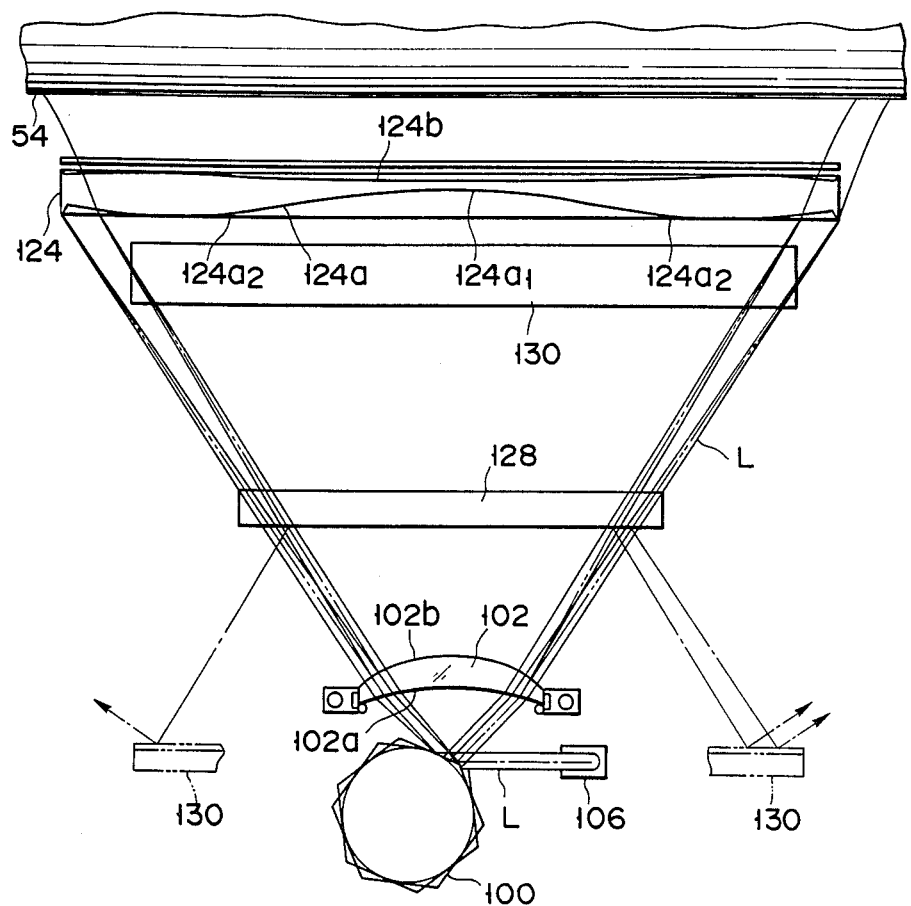
FIG. 7 shows the arrangement of an optical system in the exposure means.

As shown in FIG. 7, light-entering and -emerging faces 102a, 124a and 102b, 124b of first and second fθ lenses 102 and 124 are formed non-spherical.

First fθ lens has a positive refractive index. Light-entering face 102a of first fθ lens 102 is formed concave while its light-emerging face is formed convex. Second fθ lens 124 has first portion 124a1 including the optical axis and second portion 124a2 including no optical axis. Light-entering and -emerging faces 124a and 124b of second fθ lens 124 are shaped concave while second portion 124a2 thereof is formed convex. First portion 124a1 of second fθ lens 124 has a negative refractive index.

When their deflecting (or scanning) faces are denoted by plane y-z and their optical axis by axis z in the three dimensional coordinates relating to light-entering and -emerging faces 102a, 124a and 122b, 124b of first and second fθ lenses 102 and 124, the relationship between level z and distance y of the lenses on place y-z can be expressed by $$z = \frac{y^2/(RD)}{1 + \sqrt{1 - y^2/(RD)^2}} + ADy^4 + AEy^6 + AFy^8 + AGy^{10} +$$

wherein RD represents radius of curvature, and AD, AE, AF and AG denote biquadratic, sextic, octal and decimal non-spherical coefficients in which $|AD| + |AE| + |AF| + \cdots \neq 0$.

When the curvature of light-entering face 102a is $1/(RD_1)$ and that of light-emerging face 102b is $1/(RD_2)$ in the case of first fθ lens 102, $$0 < -\frac{1}{RD_1} < -\frac{1}{RD_2}$$

When the face of lens is concave relative to the object (or semiconductor laser 96), RE is negative.

Providing in the case of second fθ lens 124 that the curvature of light-entering face 124a is $1/(RD_3)$ and that the curvature of light-emerging face 124b is $1/)RD_4$), $$0 < \frac{1}{RD_4} < -\frac{1}{RD_3}$$

Light-entering and -emerging faces 102a, 102b and 124a, 124b of first and second fθ lenses 102 and 124 are formed similar to those which are formed when curves z obtained by the above-mentioned relational expressions are rotated round the optical axis (or axis z).

Light-emerging face 124b of second fθ lens 124 is formed toric. This toric face is obtained when curve z obtained by the above-mentioned relational expressions is rotated round a straight line parallel to axis y and separated by z(=cvx) from the lens face on the optical axis (or axis z).

AD, AE, AF and AG are in these ranges of $|AD| < 100/AP^4$, $|AE| < 100/AP^6$, $|AF| < 100/AP^8$ and $|AG| < 100/AP^{10}$, providing that the maximum radius of lenses is denoted by AP. These are such ranges that make coefficients not too large to orders or that make the lenses not too awkward in shape.

Figure 8:
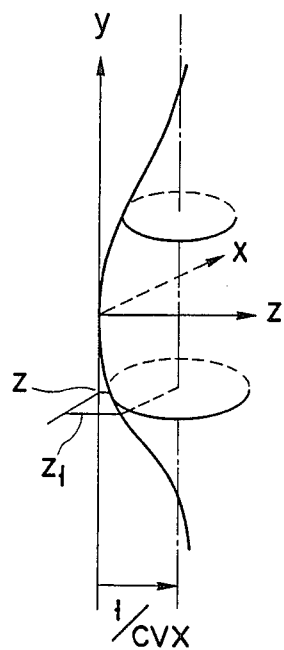
FIG. 8 is a view intended to explain the shape of lens.
Figures 9, 10, 11, 12:
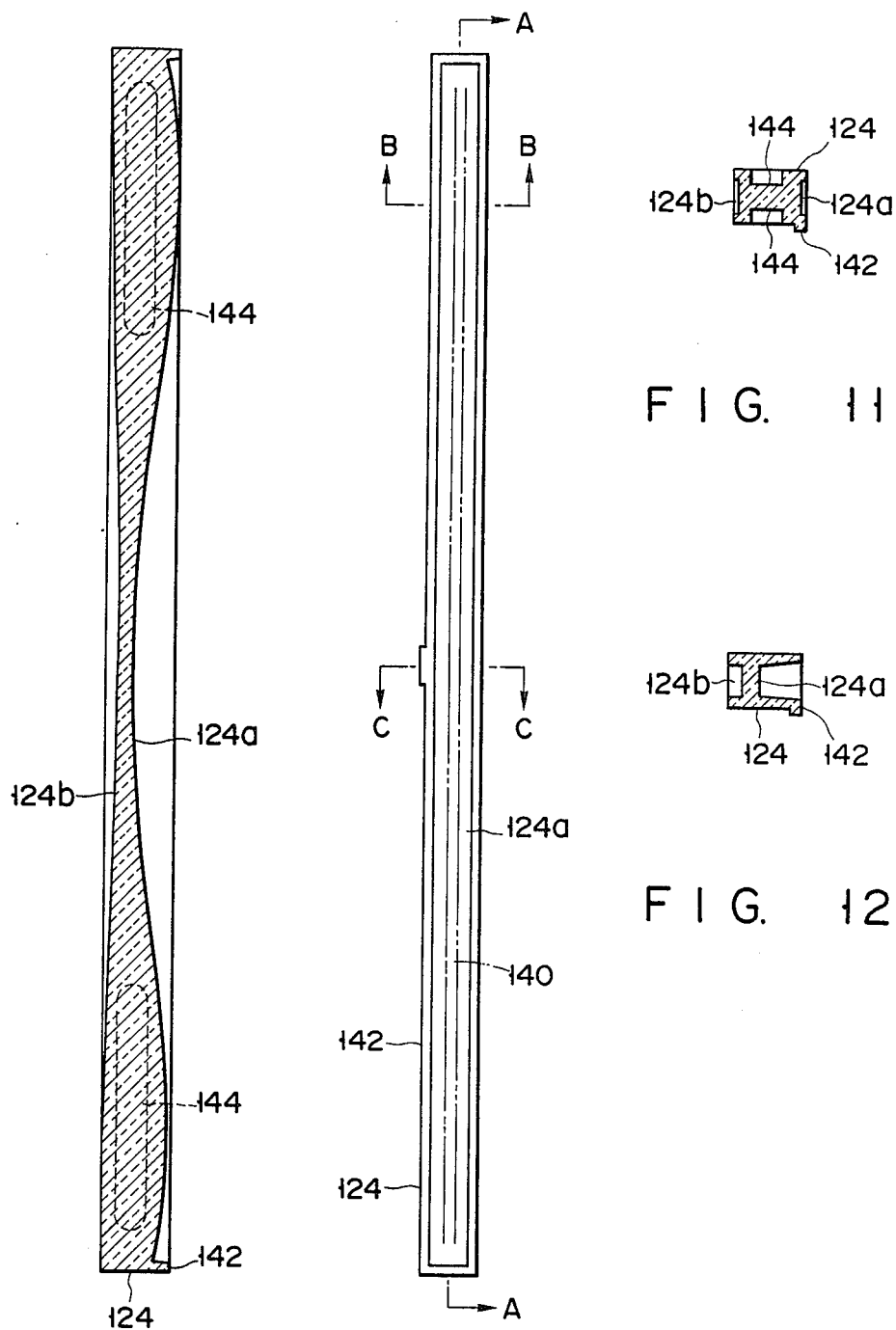
FIG. 9 is a front view showing a second fθ lens in FIG. 7.
FIG. 10 is a sectional view taken along a line A—A in FIG. 9 to show the second fθ lens.
FIG. 11 is a sectional view taken along a line B—B in FIG. 9 to show the second fθ lens.
FIG. 12 is a sectional view taken along a line C—C in FIG. 9 to show the second fθ lens

Providing that the junction of curve z relative to the optical axis (or axis z) is denoted by z=0 and that the position of rotating axis by z=1/cvx in FIG. 8, an equation for expressing the toric face can be established from the above-mentioned expressions for curves z and from the expression of $Z^2 + (1/cvx - z_1)^2 = (1/cvx - z)^2$ that $$1/cvx - \sqrt{(1/cvx - z_1)^2 + x^2} = \frac{y^2/(RD)}{1 + \sqrt{1 - y^2/(RD)^2}} +$$
$$ADy^4 + AEy^6 + AFy^8 + AGy^{10} +$$

Curves z are within plane y-z or beam deflecting plane (or scanning plane). They may be shifted a little from plane y-z, considering light and the like straying from photosensitive drum 54.

When the focal distance of combined first and second fθ lenses 102 and 124 is denoted by f, the distance θ from light-entering face 102a of first fθ lens 102 to that point of rotating polygon mirror 100 at which laser beam L is reflected is set to have a range of f/15-f/3. This distance l is 30 mm, for example. When f=209 mm in this case, 1/f=30/209=1/7.

In the case of first fθ lens 102, the distortion factor (y−fθ)/y (wherein y represents the beam position on the image field) of its fθ property is set to be smaller 10%.

When the focal distance of combined first and second fθ lenses 102 and 124 is denoted by f, the distance d from light-emerging face 125b of second fθ lens 124 to the image field (or photosensitive drum 54) is set to be in a range of f/22-f/3. This distance d is 30 mm, for example. When f=209 mm in this case, d/f=30/209=1/7.

Second fθ lens 124 is arranged in such a manner that the amount of correction relating to the curvature of field caused by the luminous flux in the deflecting (or scanning) face is about 0-30 mm.

First and second fθ lenses 102 and 124 are elongated rectangular parallelpipeds made of plastics such as acryl. Second fθ lens 124 is formed concave in section, as shown in FIGS. 9 through 12. More specifically, portion (used portion) 140 of second fθ lens 124 is concaved in a direction along the optical axis except the rim portion of its two opposite faces. Light-entering and -emerging faces 124a and 124b are formed at this used portion 140. Reinforcing portion 142 is formed around used portion 140. Portions 144, recessed in section, are formed on those faces of second fθ lens 124 where light-entering and -emerging faces are not formed.

According to the above-described arrangement, the following operational effects can be achieved.

(1) Light-entering and -emerging faces 102a, 124a and 102b, 124b of first and second fθ lenses 102 and 124 are formed non-spherical. Even when the scanning angle is made wide to have a value of ±45°, therefore, the fθ property can be fulfilled. The curvature of field can be thus corrected. As the result, the apparatus can be smaller-sized and made lower in cost.

The modulation of semiconductor laser 96 is usually carried out in proportion to time. On the other hand, rotating polygon mirror 100 rotates at a certain angular velocity. When paralleled laser beam L entering into rotating polygon mirror 100 is considered as an infinite point, the height of this point is proportional to tan relating to incident angle $\theta$ of laser beam L into rotating polygon mirror 100. Laser beam L reflected by rotating polygon mirror 100 is distorted by first and second $f\theta$ lenses 102 and 124. Image height y which is proportional to incident angle $\theta$ of laser beam L into rotating polygon mirror 100 can be thus obtained. This image height y can be expressed like $y=f\theta(rad)$. First and second $f\theta$ lenses are formed so non-spherical as to make f certain not as the focal distance but as factor of proportionality. Even when the scanning angle is made wide, the $f\theta$ property can be fulfilled.

Figure 13:
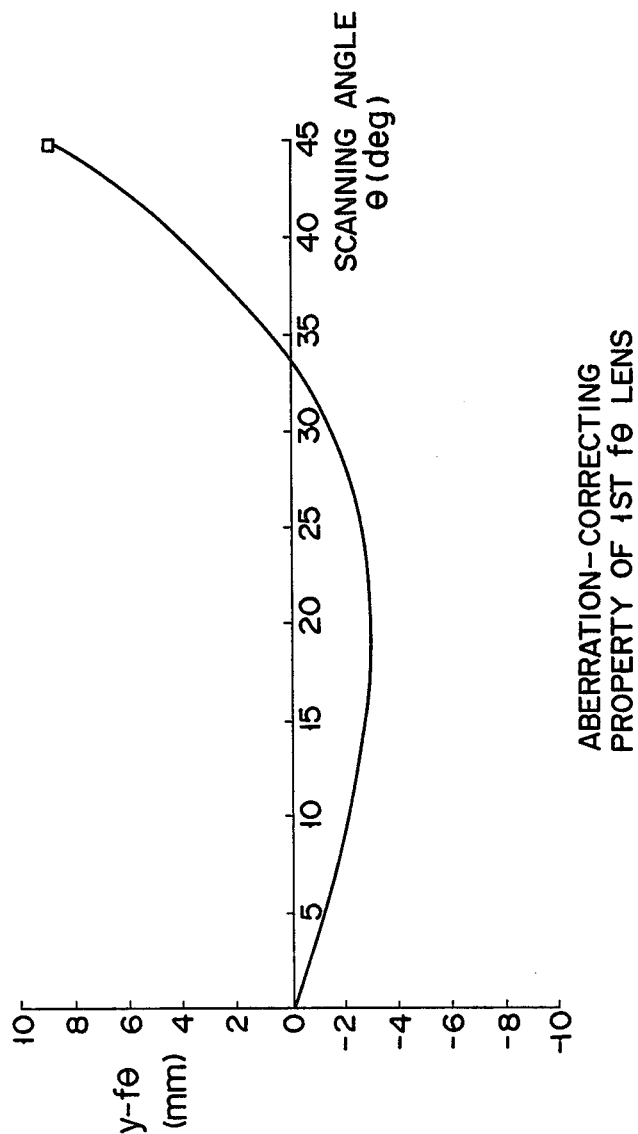
FIG. 13 is a diagram showing the aberration correcting property (or fθ property) of the first fθ lens.
Figure 14:
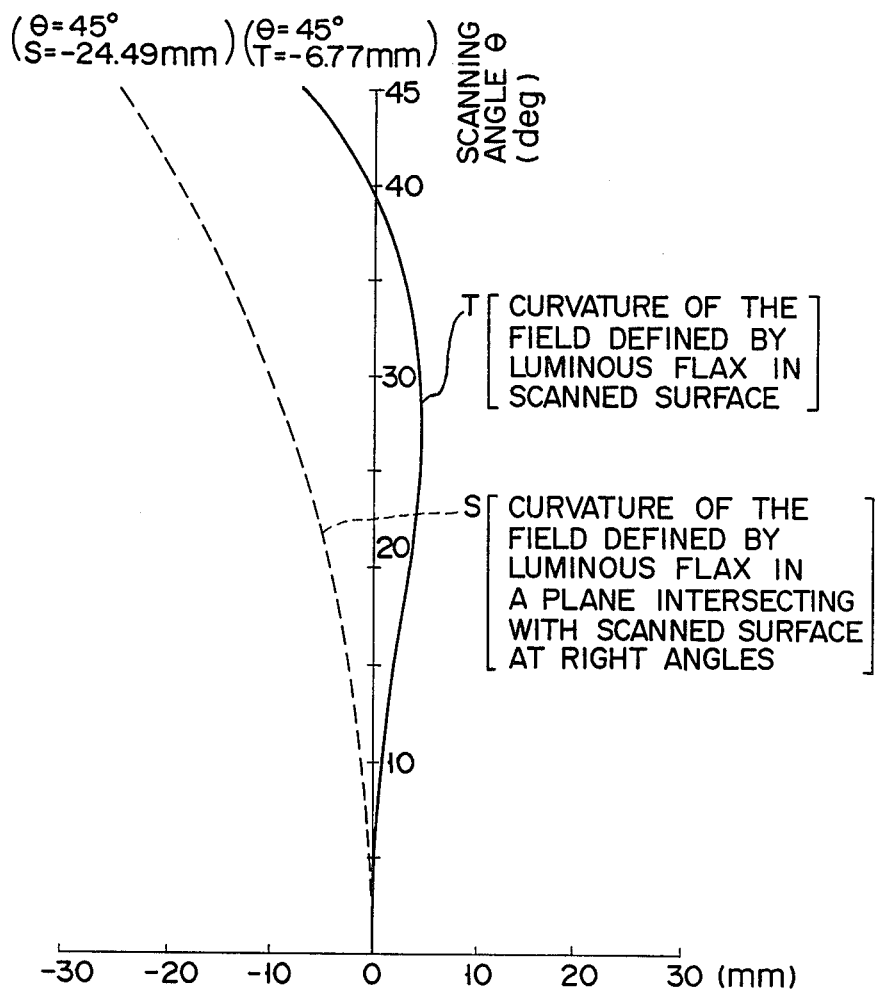
FIG. 14 is a diagram showing the relationship between the curvature of field and the scanning angle in the case of the first fθ lens.

First $f\theta$ lens 102 is a non-spherical one having a positive refractive index. Light-entering face 102a of first $f\theta$ lens 102 is formed concave while light-emerging face 102b thereof convex. First $f\theta$ lens 102 therefore shows such an $f\theta$ property as shown in FIG. 13. Further, first $f\theta$ lens 102 causes a curvature of field. However, first portion 124a1 of light-entering face 124a is formed concave while second portion 124a2 of light-emerging face 124b convex in the case of second $f\theta$ lens 124. First portion 124a1 of second $f\theta$ lens 124 has a negative refractive index and second portion 124a2 thereof has a positive refractive index. This positive refractive index is small on those sided adjacent to and remote from the optical axis of second portion 124a2 but large in the center thereof. Therefore, second $f\theta$ lens 124 can correct both of the $f\theta$ property of first $f\theta$ lens 102 and the curvature of image field caused by the luminous flux in plane y-z. Namely, the refractive index of first $f\theta$ lens 102 becomes positive and that of first portion 124a1 of second lens 124 becomes negative. Petzval curvature can be thus approximated to zero as closely as possible. Even when the scanning angle is widened to about $\pm 45°$, therefore, the $f\theta$ property can be fulfilled. At the same time, the curvature of image field caused by the luminous flux in plane y-z can be prevented. Laser beam L can be thus scanned at a wide scanning angle. The optical path extending from rotating polygon mirror 100 to photosensitive drum 54 can be shortened accordingly. The apparatus can be thus smaller-sized and made lower in cost. Further, resolution can be enhanced because paralleled laser beam L can be collected onto photosensitive drum 54 on plane y-z.

Light-emerging face 124a of second $f\theta$ lens 124 is formed toric. Therefore, the curvature of image field or tilting toward axis x (or in the sub-scanning direction) caused by the luminous flux in a section perpendicular to plane y-z can be corrected, independently of the correction of the curvature of image field on place y-z. Even in the case where reflecting faces 122 of rotating polygon mirror 100 are slanted because of the influence of working accuracy and the like, laser beam L can be collected on plane y-z. Namely, the image field after correcting the tilting in the sub-scanning direction can be made consistant with the focus or image field of paralleled laser beam on plane y-z.

The reflecting point on reflecting face 122 is moved by about 2 mm, for example, following the rotation of polygon mirror 100. This movement of the reflecting point is done along the optical axis of incident laser beam L. When reflected laser beam L is right-angled relative to incident laser beam L, therefore, the movement of reflecting point can be regarded as the movement of pupil. Even when the reflected point of laser beam L moves on reflecting face 122, therefore, it is believed that the position of image is left not influenced. However, the depth of focus which corresponds to the radius of incident laser beam L is needed as the optical system for correcting the tilting. When light-emerging face 124b of second $f\theta$ lens 124 which is formed toric is located as near the image (or photosensitive drum 54) as possible, the vertical magnification becomes small and the depth of focus becomes large accordingly, thereby making it advantageous to correct the tilting. The radius of beam which corresponds to the depth of focus needed as the optical system for correcting the tilting is about $\pm 2.5$ mm.

(2) Light-entering and -emerging faces 102a and 102b of first $f\theta$ lens 102 are formed non-spherical. In addition, the distance l from light-entering face 102a of first $f\theta$ lens 102 to that point on reflecting face 122 of rotating polygon mirror 100 where laser beam L is reflected is set to equal to f/15–f/3. The interval between rotating polygon mirror 100 and first $f\theta$ lens 102 can be thus so arranged that laser beam L reflected by second mirror 130 passes between them.

More specifically, when $l=f/15=14$ (mm), the interval between the outer end of rotating polygon mirror 100 and light-entering face 102a of first $f\theta$ lens 102 becomes 2 mm. When it is smaller than 2 mm ($l < 1/15$), laser beam L reflected by second mirror 130 cannot be passed between rotating polygon mirror 100 and first lens 102. When l is made larger, first $f\theta$ lens 102 is struck against first mirror 128. In addition, first and second $f\theta$ lenses 102 and 124 must be made longer and thicker. Therefore, more lens elements are needed and more time for forming and shaping them is also needed to thereby make the cost higher. Because of this design requirement, l is preferably f/15 ($l < f/15$) at maximum.

The distortion factor $(y-f\theta)/y$ (wherein y represents the position of beam on image field) of $f\theta$ property is made smaller than 10% in the case of first $f\theta$ lens 102. Both of the distortion caused by second $f\theta$ lens 124 and the curvature of image field caused by the luminous flux in the deflecting face can be thus corrected to a larger extent.

First $f\theta$ lens shows its original ability when it is combined with second $f\theta$ lens 124. Unless the distortion is substantially corrected by first $f\theta$ lens 102, however, both of the distortion and the curvature of image field cannot be corrected to the large extent. When the distortion is substantially corrected by first $f\theta$ lens 102, therefore, second $f\theta$ lens 124 can be used mainly to correct the curvature of image field. The distortion at first $f\theta$ lens 102 used was that $(y-f\theta)/y = 8.7/164 = 5.3\%$ at maximum, as shown in FIG. 13.

(3) Light-entering and -emerging faces 124a and 124b of second $f\theta$ lens 124 are formed non-spherical. These non-spherical shapes are such that the lens faces on plane y-z are expressed by the above mentioned curves z. In addition, the distance d from light-emerging face 124b of second $f\theta$ lens 124 to photosensitive drum 54 is set to equal to f/22–f/3. Sufficient tilting correction (or correction of the curvature of image field caused by the luminous flux in a section perpendicular to the scanning face) can be achieved. Further, no design problem is caused even when it is arranged like this.

When second $f\theta$ lens 124 is separated too remote from photosensitive drum 54, it is struck against motor 118. Further, the refractive index becomes small at the light-emerging toric face and the radius of beam becomes large in the sub-scanning direction (or direction along plane y-z). Furthermore, when d is set larger than f/3, sufficient tilting correction cannot be achieved. As d is made smaller, it is needed to make the lens thicker and this is disadvantageous from the viewpoint of manufacture. When d is made smaller than f/22, for example, the thickness of the lens becomes larger than 25 mm. It is therefore preferable to set d equal to f/22 -f/3.

Second fθ lens 124 is formed so that the curvature of image field caused by the luminous flux in the deflecting (or scanning) face can be corrected to an extent of about 0–30 mm. Sufficient tilting correction can be thus achieved.

As described above, first fθ lens 102 is intended mainly to correct the fθ property. The curvature of image field cannot be reduced accordingly. It is therefore needed that second fθ lens 124 have the relatively high ability of correcting the curvature of image field. However, second fθ lens 124 is intended to correct the fθ property a little and also correct the tilting. This makes it difficult to give second fθ lens 124 the high ability of correction. However, first fθ lens 102 enables the curvature of image field to be made smaller than 30 mm. It may be enough therefore that the curvature of image field is corrected to an extent of about 0–30 mm only by second fθ lens 124. FIG. 13 shows the curvature of image field in the case of first fθ lens 102. The curvature of image field caused by the luminous flux in the scanning face is about 7 mm. This can be corrected by second fθ lens 124. The curvature of image field (or tilting) caused by the luminous flux in a face perpendicular to the scanning face is about 25 mm. This can be corrected mainly by light-emerging toric face 124b of second fθ lens 124.

(4) First and second fθ lens 102 and 124 are formed non-spherical and made of plastics. They can have a higher accuracy and be provided at a lower cost accordingly.

Figure 15:
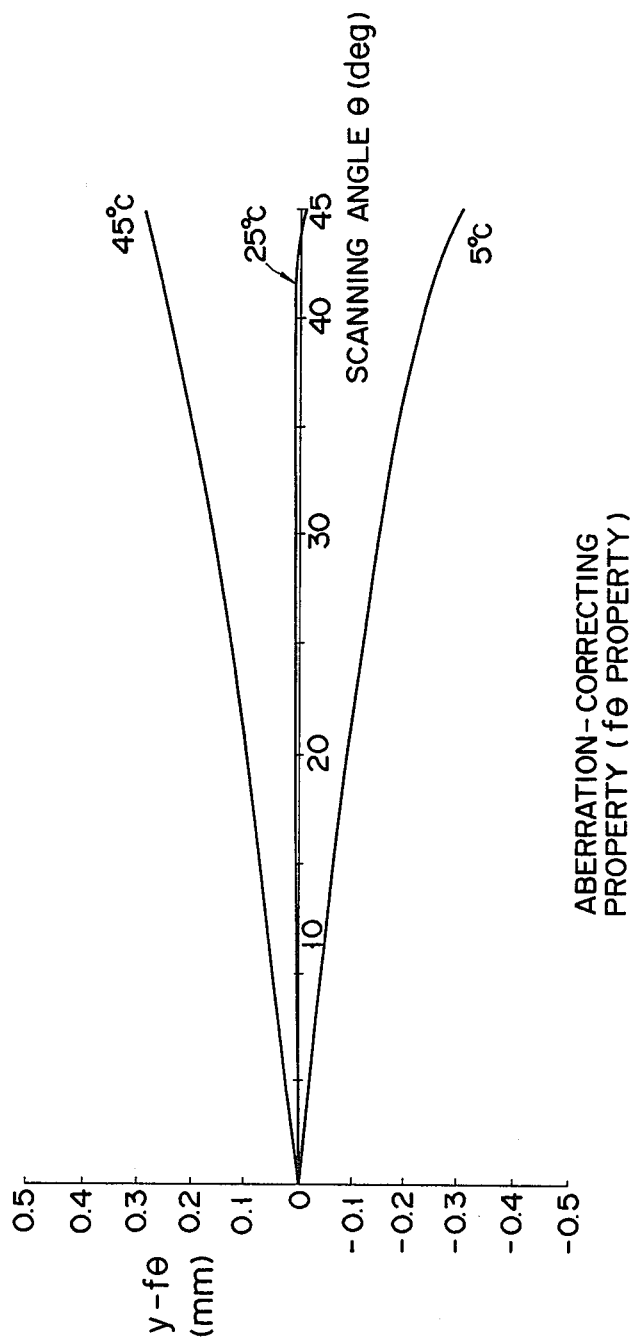
FIG. 15 is a diagram showing the aberration correcting property (or fθ property) of the first and second fθ lens.
Figure 16:
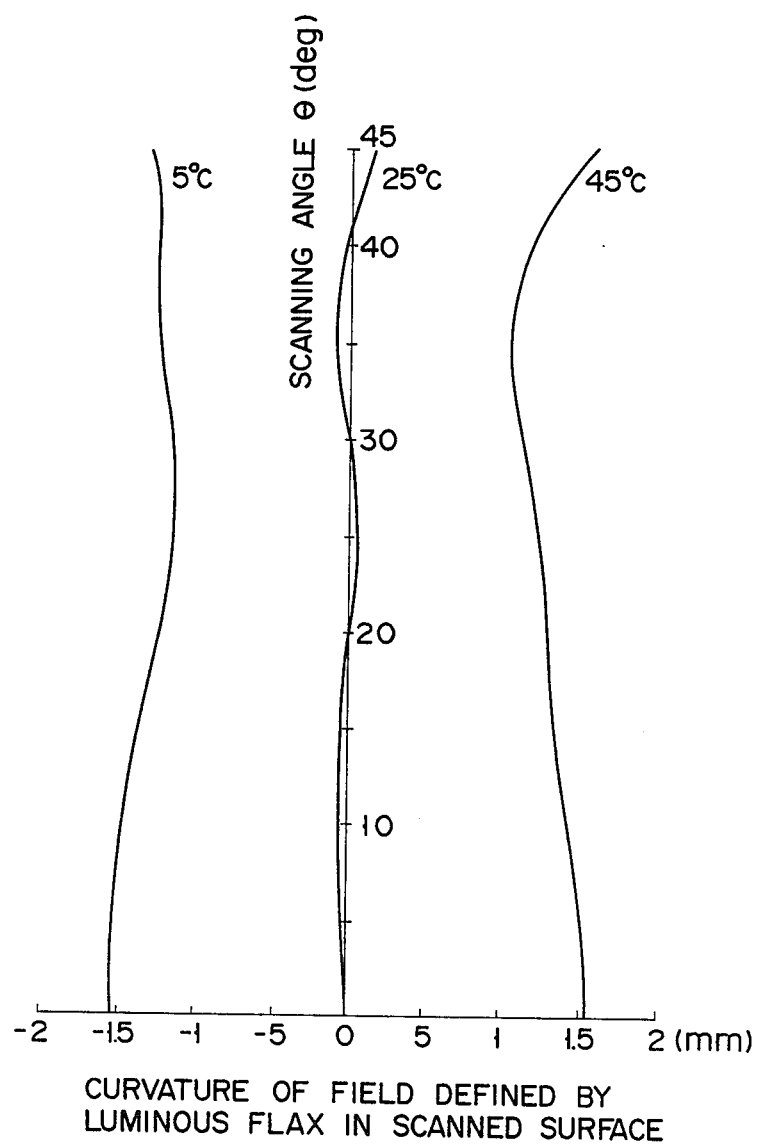
FIG. 16 is a diagram showing the relationship between the curvature of field and the scanning angle created by a luminous flux in the scanning face.
Figure 17:
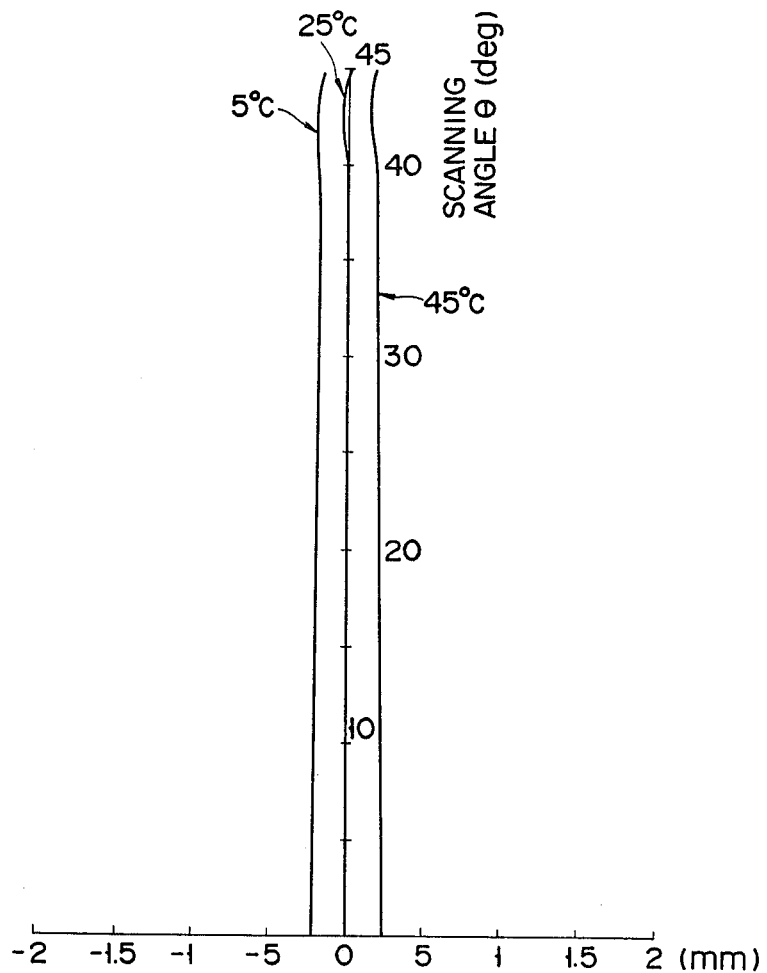
FIG. 17 is a diagram showing the relationship between the curvature of field of the scanning angle created by a luminous flux in a face perpendicular to the scanning face.

The aberration property is excellently corrected by first and second fθ lenses 102 and 124 at room temperature (or 15° C.), as shown in FIGS. 15 through 17. Even when the refractive index of plastics is changed by temperature, this refractive index is allowable.

First and second fθ lenses 102 and 124 are formed as elongated rectangular parallelepipeds. The volume of first and second fθ lenses 102 and 124 can be thus made small. The time of forming and shaping them can be shortened accordingly. As the result, their manufacturing cost can be lowered.

Second fθ lens 124 if formed concave in section. More specifically, portion (or used portion) 140 is concaved in a direction along the optical axis, except the rim portion of two opposite faces of second fθ lens 124. Light-entering and -emerging faces 124a and 124b are formed at this used portion 140. They can be thus formed independent of each other. The accuracy of forming and shaping them can be enhanced accordingly.

Portions 144, recessed in section, are formed at that area of second fθ lens 124 where its light-entering and -emerging faces 124a and 124b are not formed. The time of forming and shaping second fθ lens 124 can be thus shortened without reducing the strength thereof. One minute is usually needed to process the thickness of 1 mm in the course of forming and shaping plastic lenses with high accuracy. Therefore, lenses as thin as possible are more advantageous in accuracy and cost. When they are made too thin, however, they are likely to be warped. Used portion 140 of second fθ lens 124 is formed at that area which is merely about 1 mm wide in the center portion of second fθ lens 124. Second fθ lens 124 is therefore provided with recess portions 144 to eliminate any additional process of forming and shaping it. The time of forming and shaping it can be thus shortened without reducing its strength.

(5) First and second mirrors 128 and 130 are located in such a way that laser beam L reflected by second mirror 130 can pass between rotating polygon mirror 100 and first fθ lens 102. The interval between rotating polygon mirror 100 and first mirror 128 can be thus made shorter, as compared with the conventional apparatus (shown in FIG. 1) wherein laser beam L passes between first fθ lens 102 and first mirror 128. The whole of the optical system can be made more compact accordingly.

(6) Second mirror 128 is located adjacent to rotating polygon mirror 100. The distance between first mirror 128 and rotating polygon mirror 100 can be shortened accordingly. The whole of the optical system can be thus smaller-sized. Motor 118 is mounted on the top of case 82. Rotating polygon mirror 100 is attached to shaft 120 of motor 118, slanting and facing downward. Even when second mirror 130 is located adjacent to rotating polygon mirror 100, therefore, motor 118 does not become an obstacle against second mirror 128.

Figure 18:
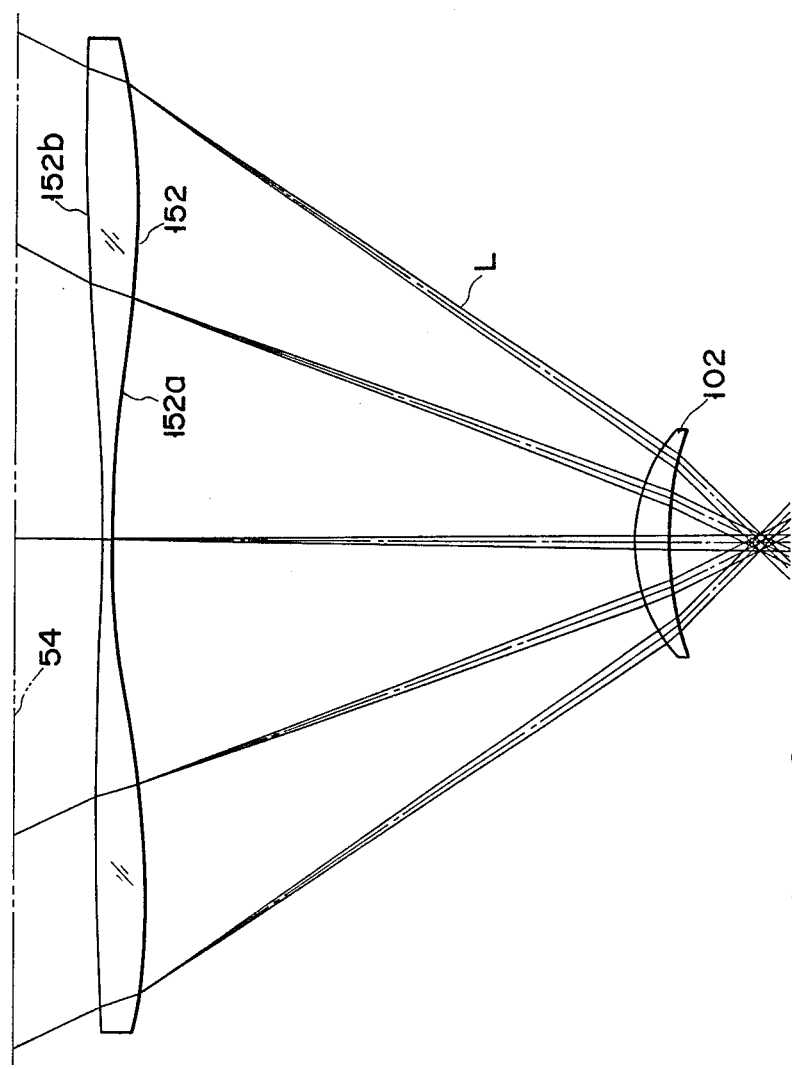
FIG. 18 shows a variation of the second fθ lens.

FIG. 18 shows a variation of the second fθ lens. Light-emerging face 152a of this second fθ lens 152 is formed toric, having a certain refractive index in its cut face when it is cut along a plane parallel to plane x-z. As shown in FIG. 19, it is a toric face, having a certain refractive index independent of distance y. An equation of this toric face can be obtained from the expressions for the above-mentioned curves z and from $(z_z - z)^2 + x^2 = 1/cvx^2$ that $$z_2 = \sqrt{1/cvx^2 - x^2} + \frac{y^2/(RD)}{1 + \sqrt{1 - y^2/(RD)^2}} +$$

$$ADy^4 + AEy^6 + AFy^8 + AGy^{10} + .$$

Light-entering 152a of second fθ lens 152 is similar to light-entering face 124a of second fθ lens 124.

According to this arrangement, working can be made easier when female halves of dies for molding plastics are made, particularly when lenses are polished.

Figure 20:
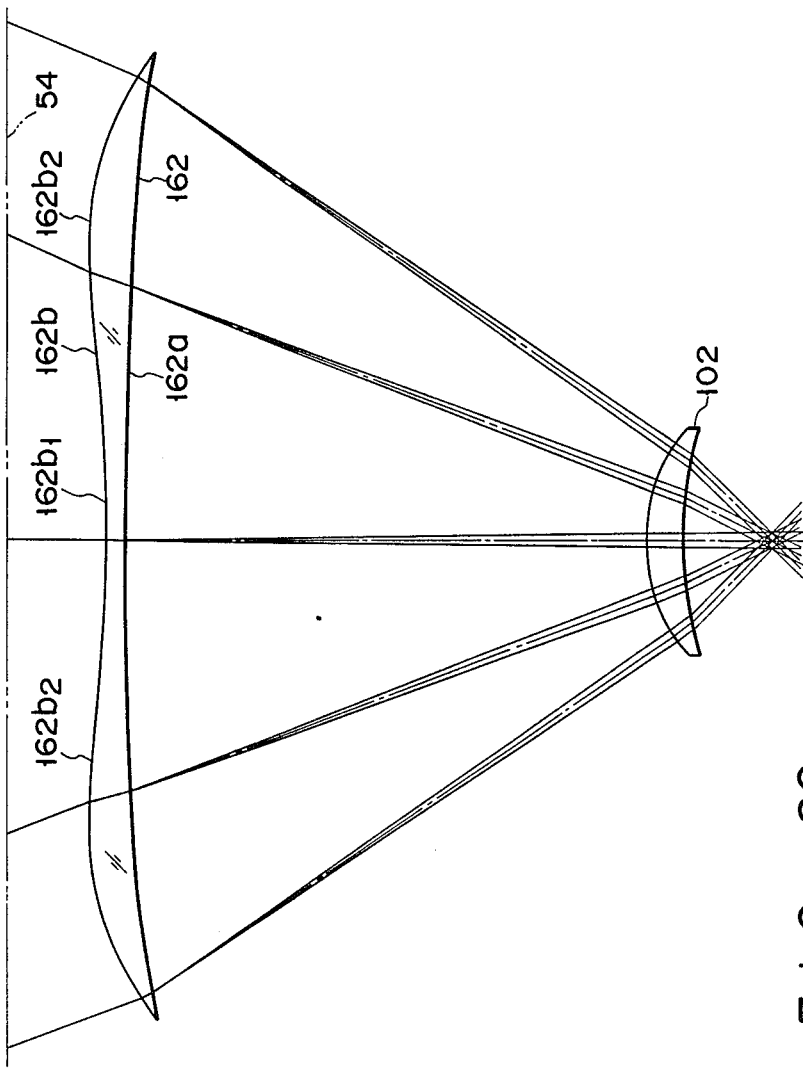
FIG. 20 shows another variation of the second fθ lens.

FIG. 20 shows another variation of the second fθ lens. This second fθ lens 162 is formed concave at light-entering face 162a thereof. Light-emerging face 162b of second fθ lens 162 is formed concave at first portion 162b1 thereof and convex at second portion 162b2 thereof. First portion 162b1 of second fθ lens 162 has a negative refractive index.

When the deflecting (or scanning) face is denoted by plane y-z and the optical by axis z in the three-dimensional coordinates, light-entering and -emerging faces 162a and 162b of second fθ lens 162 can be expressed by the following relational expression between the height of lens faces on place y-z and distance y:

$$z = \frac{y^2/(RD)}{1 + \sqrt{1 - y^2/(RD)^2}} + ADy^4 + AEy^6 + AFy^8 + AGy^{10} +$$

wherein RD represents the radius of curvature and AD, AE, AF and AG denote biquadratic, sextic, octal and decimal non-spherical coefficients in which $|AD|+|AE|+|AF|+\cdots \neq 0$.

When the curvature of light-entering face 162a is 1/(RD$_3$) and that of light-emerging face 162b is 1/(RD$_4$), $$0 < -\frac{1}{RD_3} < \frac{1}{RD_4}$$

Light-entering face 162a of second f$\theta$ lens 162 has such a toric face that is obtained when curve z expressed by the above-mentioned equation is rotated round an axis parallel to axis y and crossing axis z.

Figure 21:
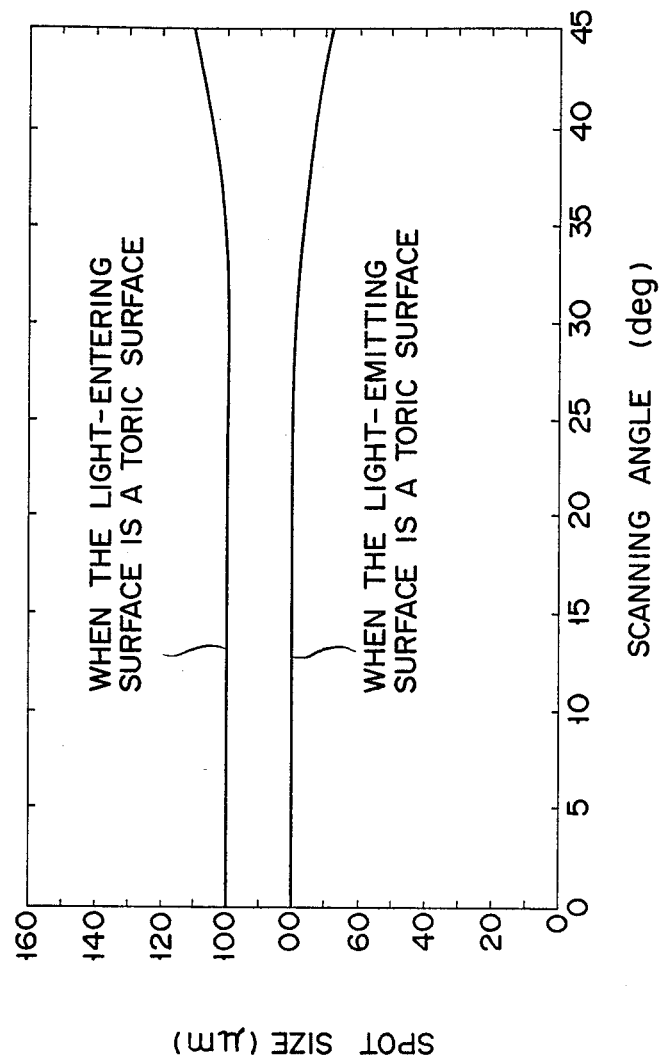
FIG. 21 is a diagram showing the relationship between the scanning angle and the spot size.

When light-emerging face 162b is formed toric, the radius of beam in the sub-scanning direction tends to become small where the angle of view is large, as shown in FIG. 21. When light-entering face 162a is formed toric, however, the radius of beam in the sub-scanning direction tends to become large where the angle of view is large. The luminous energy of beam becomes smaller as the angle of view becomes larger. It is therefore preferable to make light-entering face 162a toric for the purpose of making the size of images uniform on photosensitive drum 54.

What is claimed is:

1. A recording apparatus for recording images on a recording medium, comprising:

means for scanning light modulated according to information; and an f$\theta$ lens system for imaging, on the recording medium, the light scanned by the scanning means, said f$\theta$ lens system having first and second lenses arranged, in this order, next to the scanning means and on the optical path through which the light is introduced from the scanning means onto the recording medium;

said first and second lenses having light-entering and light-emerging faces each formed in a non-spherical shape;

said second lens having a first area near its optical axis with a negtive refractive index, and a second area farther from the optical axis than the first area with a positive refractive index.

2. The recording apparatus according to claim 1 wherein said first lens has a positive refractive index, one of the light-entering and -emerging faces of said first lens is formed concave while the other thereof is formed convex, said second lens has a first area including an optical axis and a second area including no optical axis, and the light-entering and -emerging faces of said second lens are formed concave at the first area thereof while they are formed convex at the second area thereof, thereby allowing the first area to have a negative refractive index.

3. The recording apparatus according to claim 2, wherein provided that the curvature of the light-entering face is denoted by 1/(RD$_1$) and the curvature of the light-emerging face is denoted by 1/(RD$_2$) in the case of said first lens, in the following relational expression between the height of a lens and a distance y on a plane y-z in the three-dimensional coordinates;

$$z = \frac{y^2/(RD)}{1 + \sqrt{1 - y^2/(RD)^2}} + ADy^4 + AEy^6 + AFy^8 + AGy^{10} +$$

wherein RD represents the radius of curvature, and AD, AE, AF, and AG denote biquadratic, sextic, octal, and decimal non-spherical coefficients in which $|AD|+|AE|+|AF|+\cdots \neq 0$, a relation can be obtained wherein $$0 < -\frac{1}{RD_1} < -\frac{1}{RD_2}$$

and provided that the curvature of the light-entering face is denoted by 1/(RD$_3$) and the curvature of the light-emerging face is denoted by 1/(RD$_4$) in the case of said second lens, in the above-mentioned relational expression, a relation can be obtained wherein $$0 < \frac{1}{RD_4} < -\frac{1}{RD_3}$$

4. The recording apparatus according to claim 3, wherein the light-emerging face of said second lens has such a toric face as is obtained when the curve z expressed by the above-mentioned relational expression is rotated round a certain axis parallel to the axis y and crossing the axis z.

5. The recording apparatus according to claim 1, wherein said first lens has a positive refractive index, one of the light-entering and -emerging faces of said first lens is formed concave while the other thereof is formed convex, and said second lens has a first area including an optical axis and a second area including no optical axis, one of the light-entering and -emerging faces of said second lens is formed concave while the other thereof is formed concave at the first area and convex at the second area, thereby allowing at least the first area to have a negative refractive index.

6. The recording apparatus according to claim 5, wherein provided that the curvature of the light-entering face is denoted by 1/(RD$_1$) and the curvature of the light-emerging face is denoted by 1/(RD$_2$) in the case of said first lens, in the following relational expression between the height of a lens face and a distance y on a plane y-z in the three-dimensional coordinates;

$$z = \frac{y^2/(RD)}{1 + \sqrt{1 - y^2/(RD)^2}} + ADy^4 + AEy^6 + AFy^8 + AGy^{10} +$$

wherein RD denotes the radius of curvature, and AD, AE, AF, and AG represent biquadratic, sextic, octal, and decimal non-spherical coefficients in which $|AD|+|AE|+|AF|+\cdots \neq 0$, a relation can be obtained wherein $$0 < -\frac{1}{RD_1} < -\frac{1}{RD_2}$$

and provided that the curvature of the light-entering face is denoted by 1/(RD$_3$) and the curvature of the light-emerging face is denoted 1/(RD$_4$) in the case of said second lens, in the above-mentioned relational expression, a relation can be obtained wherein $$0 < -\frac{1}{RD_3} < \frac{1}{RD_4}$$

7. The recording apparatus according to claim 6, wherein the light-entering face of said second lens has such a toric face as is obtained when the curve z expressed by the above-mentioned relational expression is rotated round a certain axis parallel to the axis y and crossing the axis z.

8. The recording apparatus according to claim 6, wherein at least one of the light-entering and -emerging faces of said second lens can be expressed by the following relational expression between the height of a lens and a distance y on a place y-z in the three-dimensional coordinates;

$$z = \frac{y^2/(RD)}{1 + \sqrt{1 - y^2/(RD)^2}} + ADy^4 + AEy^6 + AFy^8 + AGy^{10} + \cdots$$

wherein RD denotes the radius of curvature, and AD, AE, AF, and AG represent biquadratic, sextic, octal, and decimal non-spherical coefficients in which $|AD|+|AE|+|AF|+\cdots \neq 0$, and the curvature at a section parallel to a plane x-z is certain independently of the distance y.

9. The recording apparatus according to claim 1, wherein said non-spherical faces can be expressed by the following relational expression between the height z of a lens and a distance y on a plane y-z in the three-dimensional coordinates;

$$z = \frac{y^2/(RD)}{1 + \sqrt{1 - y^2/(RD)^2}} + ADy^4 + AEy^6 + AFy^8 + AGy^{10} + \cdots$$

wherein RD denotes the radius of curvature, and AD, AE, AF, and AG represent biquadratic, sextic, octal, and decimal non-spherical coefficients in which $|AD|+|AE|+|AF|+\cdots \neq 0$, and provided that the maximum radius of lens is denoted by AP, the non-spherical coefficients are in ranges of $|AD|<100/(AP)^4, |AE|<100/(AP)^6, |AF|<100/(AP)^8, |AG|<100/(AP)^{10}, \cdots$.

10. The recording apparatus according to claim 1, wherein said first and second lenses are made of plastics.

11. The recording apparatus according to claim 10, wherein said first and second lenses are formed as elongated rectangular parallelepipeds.

12. The recording apparatus according to claim 10, wherein at least one of said first and second lenses is provided with recesses at that portion thereof through which the light travelling from the scanning means to the recording medium cannot pass.

13. The recording apparatus according to claim 1, wherein when the focal distance of said fθ lens system is denoted by f, the distance from the light-entering face of said first lens to the light-emerging point of said scanning means is in a range of f/15-f/3.

14. The recording apparatus according to claim 13, wherein said first lens has such an fθ property that the distortion factor (y−fθ)/y can be made smaller than 10% when the position of luminous flux on the image field is denoted by y.

15. The recording apparatus according to claim 1, wherein when the focal distance of said fθ lens system is denoted by f, the distance from the light-emerging face of said second lens to the image field is in a range of f/22-f/3.

16. The recording apparatus according to claim 15, wherein said second lens has such an fθ property that the curvature of image field in the scanning face caused by the luminous flux which has been scanned by the scanning means can be corrected to an extent of 0–30 mm.

* * * * *